US007330102B2

(12) United States Patent
Fletcher

(10) Patent No.: US 7,330,102 B2
(45) Date of Patent: Feb. 12, 2008

(54) METHOD OF CUSTOMIZING A VEHICLE WITH DECALS, A VEHICLE DECAL ASSEMBLY AND A VEHICLE CUSTOMIZED WITH DECALS IN ACCORDANCE WITH THE METHOD

(75) Inventor: Kenneth R. Fletcher, Nanaimo (CA)

(73) Assignee: Tec Tint Inc., Duncan, BC (CA)

( * ) Notice: Subject to any disclaimer, the term of this patent is extended or adjusted under 35 U.S.C. 154(b) by 242 days.

(21) Appl. No.: 11/100,287

(22) Filed: Apr. 6, 2005

(65) Prior Publication Data

US 2005/0231527 A1  Oct. 20, 2005

(30) Foreign Application Priority Data

Apr. 14, 2004  (CA) .................................. 2,463,461

(51) Int. Cl.
*B60Q 1/00* (2006.01)
(52) U.S. Cl. ...................... 340/425.5; 340/555; 362/31
(58) Field of Classification Search ............ 340/425.5, 340/438, 468, 555, 815.42; 345/600; 362/31, 362/145
See application file for complete search history.

(56) References Cited

U.S. PATENT DOCUMENTS

| 3,695,681 | A | 10/1972 | Dockery ................... 296/97 F |
| D267,888 | S | 2/1983 | Williams ..................... D20/11 |
| 4,893,908 | A | 1/1990 | Wolf et al. .................. 350/357 |
| 5,390,045 | A | 2/1995 | Bernard, Jr. ................ 359/275 |
| 5,499,165 | A | 3/1996 | Holmes, Jr. .................. 362/31 |
| 5,598,293 | A | 1/1997 | Green ......................... 359/275 |
| 5,708,523 | A | 1/1998 | Kubo et al. ................. 359/269 |
| 5,940,216 | A | 8/1999 | Gibbs .......................... 359/601 |
| 6,039,390 | A | 3/2000 | Agrawal et al. ............. 296/211 |
| 6,067,008 | A * | 5/2000 | Smith ......................... 340/438 |
| 6,262,531 | B1 * | 7/2001 | Inoguchi et al. ............ 313/506 |
| 6,270,236 | B1 | 8/2001 | Brussog ...................... 362/249 |
| 6,373,618 | B1 | 4/2002 | Agrawal et al. ............ 359/265 |
| 6,414,790 | B1 | 7/2002 | Bennett ....................... 359/485 |

(Continued)

FOREIGN PATENT DOCUMENTS

DE        4228927        10/1993

(Continued)

OTHER PUBLICATIONS

Howard, Webster E., 'Better Displays with Organic Films', Scientific American: p. 76-81, Feb. 2004.

(Continued)

*Primary Examiner*—Phung T. Nguyen
(74) *Attorney, Agent, or Firm*—Davis Bujold & Daniels, PLLC

(57) ABSTRACT

A method of customizing a vehicle with decals. A first step involves securing a film of light emitting material containing a matrix of pixels to a body of a vehicle. A second step involves providing a controller having a memory in which is stored at least one graphic image. A third step involves providing a power source. A fourth step involves connecting the film to the controller and power source via a conductive circuit. A fifth step involves displaying the at least one graphic image stored in the memory of the controller on the film by selectively illuminating pixels in the matrix.

19 Claims, 3 Drawing Sheets

U.S. PATENT DOCUMENTS

| | | | |
|---|---|---|---|
| 6,471,360 B2 | 10/2002 | Rukavina et al. | 359/609 |
| 6,493,128 B1 | 12/2002 | Agrawal et al. | 359/265 |
| 6,580,472 B1 * | 6/2003 | Willingham et al. | 349/16 |
| 6,764,776 B2 * | 7/2004 | Seo | 428/690 |
| 7,048,400 B2 * | 5/2006 | Murasko et al. | 362/84 |
| 7,048,422 B1 * | 5/2006 | Solomon | 362/503 |
| 2003/0043567 A1 | 3/2003 | Hoelen et al. | 362/31 |
| 2003/0050744 A1 * | 3/2003 | Saraiva | 701/1 |
| 2003/0210355 A1 | 11/2003 | Dao | 349/16 |
| 2004/0031234 A1 | 2/2004 | Emde | 52/786.11 |

FOREIGN PATENT DOCUMENTS

| | | |
|---|---|---|
| DE | 10064742 | 6/2002 |
| JP | 6095169 | 4/1994 |
| JP | 7084288 | 3/1995 |
| WO | WO 90/04805 | 5/1990 |
| WO | WO 01/84230 A1 | 11/2001 |

OTHER PUBLICATIONS

Cohen, Jeremy, 'Phillips Invests $5.5 Million in Visson's Woven Display', available at http://www.sid.org/news/archive/newsstory0102.html, Feb. 2001.

Collection of Publications concerning Royal Phillips Electronics of Netherlands investment in Vission's Woven Display, 18 pgs, Feb. 2002.

* cited by examiner

METHOD OF CUSTOMIZING A VEHICLE WITH DECALS, A VEHICLE DECAL ASSEMBLY AND A VEHICLE CUSTOMIZED WITH DECALS IN ACCORDANCE WITH THE METHOD

FIELD OF THE INVENTION

The present invention relates to a method of customizing a vehicle with decals, a vehicle decal assembly and a vehicle customized with decals in accordance with the teachings of the method.

BACKGROUND OF THE INVENTION

Vehicle owners like to "customize" their vehicles in order to give each vehicle a unique appearance that reflects the personality and interests of the vehicle owner. One popular method of customizing a vehicle is to place decals on the vehicle. The most common places for decals are on the front hood, along the side of the vehicle, on the trunk or along a top portion of the front windshield or along either a top portion or a bottom portion of the rear windshield. The decals presently in common use consist of a graphic carried on a vinyl substrate. The decals are readily available through most high performance automotive outlets. Examples of decals presently available can be viewed at websites, such as: spoilers4less.com; ultimatedecals.com; and decaldriveway.com.

SUMMARY OF THE INVENTION

The present invention relates to an innovative method of customizing a vehicle with decals.

According to one aspect of the present invention there is provided a method of customizing a vehicle with decals. A first step involves securing a film of light emitting material containing a matrix of pixels to a body of a vehicle. A second step involves providing a controller having a memory in which is stored at least one graphic image. A third step involves providing a power source. A fourth step involves connecting the film to the controller and power source via a conductive circuit. A fifth step involves displaying the at least one graphic image stored in the memory of the controller on the film by selectively illuminating pixels in the matrix.

There will hereinafter be described the best mode of customizing a vehicle in accordance with the teachings of the present method. There will further be described a vehicle decal assembly that may be sold to persons wishing to customize their own vehicles in accordance with the teachings of the present method. There will finally be described a vehicle which has been customized in accordance with the teachings of the present method.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of customizing a vehicle with decals will now be described with reference to FIGS. 1 through 3.

Figure 1:
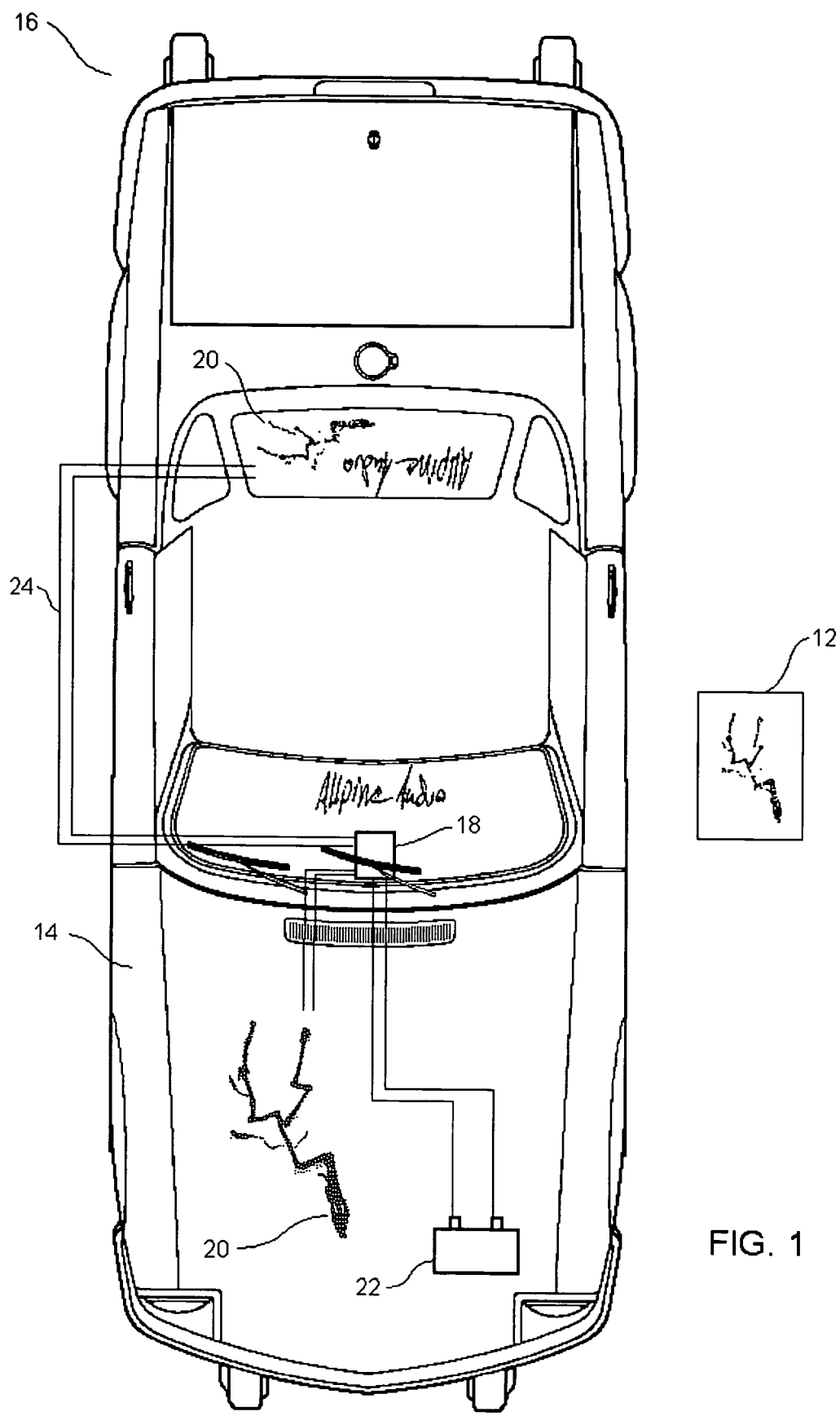
FIG. 1 is a top plan view of a vehicle customized with decals in accordance with the teachings of the present method.

Referring to FIG. 1, the method, in its most basic form, consists of the following steps. A first step involves securing a film 12 of light emitting material containing a matrix of pixels (not shown) to a body 14 of a vehicle 16. It is anticipated that the film will be laminated onto a carrier substrate, such as vinyl. The preferred manner of securing film 12 is by gluing the vinyl substrate onto the vehicle with an adhesive. A second step involves providing a controller 18 having a memory (not shown) in which is stored at least one graphic image. There is illustrated an image of a lightning bolt 20. A third step involves providing a power source. There is illustrated the use of a battery 22 from vehicle 16 as a power source. It will be understood that a separate power source could be supplied. A fourth step involves connecting film 12 to controller 18 and power source 22 via a conductive circuit, generally indicated by reference numeral 24. A fifth step involves displaying the at least one graphic image (lighting bolt 20) stored in the memory of controller 18 on film 12 by selectively illuminating pixels in the matrix.

There are a number of display films which would be suitable for use as film 12. The film used could be any one of a polymer light emitting diode, an organic light emitting diode, organic vapour phase deposition or flexible liquid crystal display. These films come in two types: films having a passive matrix and films having an active matrix. It is preferred that the matrix be an active-matrix. With an active-matrix each pixel remains static in either an "on" or "off" condition until the graphic image (lightning bolt 20) is changed by controller 18. This means that lightning bolt 20 will continue to be visible, even when vehicle 16 is parked and turned off. It also means that there will be no "flickering" of the image of lightning bolt 20.

While an active-matrix can provide a superb quality of static image, one of the great advantages of this technology is its ability to provide a dynamic image. It is, therefore, preferred that more than one graphic image be stored in the memory of the controller. The controller follows a display sequence in which the graphic image displayed on the film is always dynamically changing. In the example illustrated, lightning bolt 20 would be constantly moving, disappearing and reappearing, to replicate genuine lightning as it might appear in the sky during a thunderstorm.

That segment of the population that likes to customize their vehicles, are also into powerful audio systems. Referring to FIG. 2, a further enhancement to the system is to connect controller 18 to an audio output device 26 which plays music. It will be appreciated that there are a variety of audio output devices which could be used, such as: a radio, a tape machine, a compact disk player, and no doubt other audio formats will emerge over the next few years. The display sequence from controller 18 is coordinated with music from audio output device 26. This makes the dynamically changing graphic images displayed on film 12 appear to be dancing to the music. In the example selected for illustration, the movements of lightning bolt 20 would be coordinated with the music the vehicle operator chose to play.

The segment of the population that likes to customize their vehicles, commonly take measures to protect their vehicles from theft: theft of the vehicle contents, theft of the vehicle audio system, and theft of the vehicles themselves. If a vehicle alarm goes off, it is desirable that there be no doubt as to which vehicle in the parking lot has been tampered with. If attention is immediately drawn to the vehicle, the thieves may discontinue their activities and flee. It is preferred that controller 18 be connected to a vehicle theft alarm system 28. This can be through an audio link (as was the case with audio system 26) or through an alarm condition coupling. The intent is that the dynamically changing graphic images displayed on film 12 will change frenetically when an alarm condition exists.

It is envisaged that the vehicle owner will want to frequently change the images displayed, perhaps daily or even more frequently. Referring to FIG. 3, it is envisaged that controller 18 will have an interface 30 which enables new graphic images to be downloaded into memory. This can be done through any common computer interface. Controller 18 can have a disk drive like a computer, a memory card like a camera or a USB port as a data transfer connection. It is envisaged that a USB port is the most practical and interface 30 has been illustrated as a USB port. Undoubtly, there will be other interfaces developed in the future which could serve this function.

Figure 2:
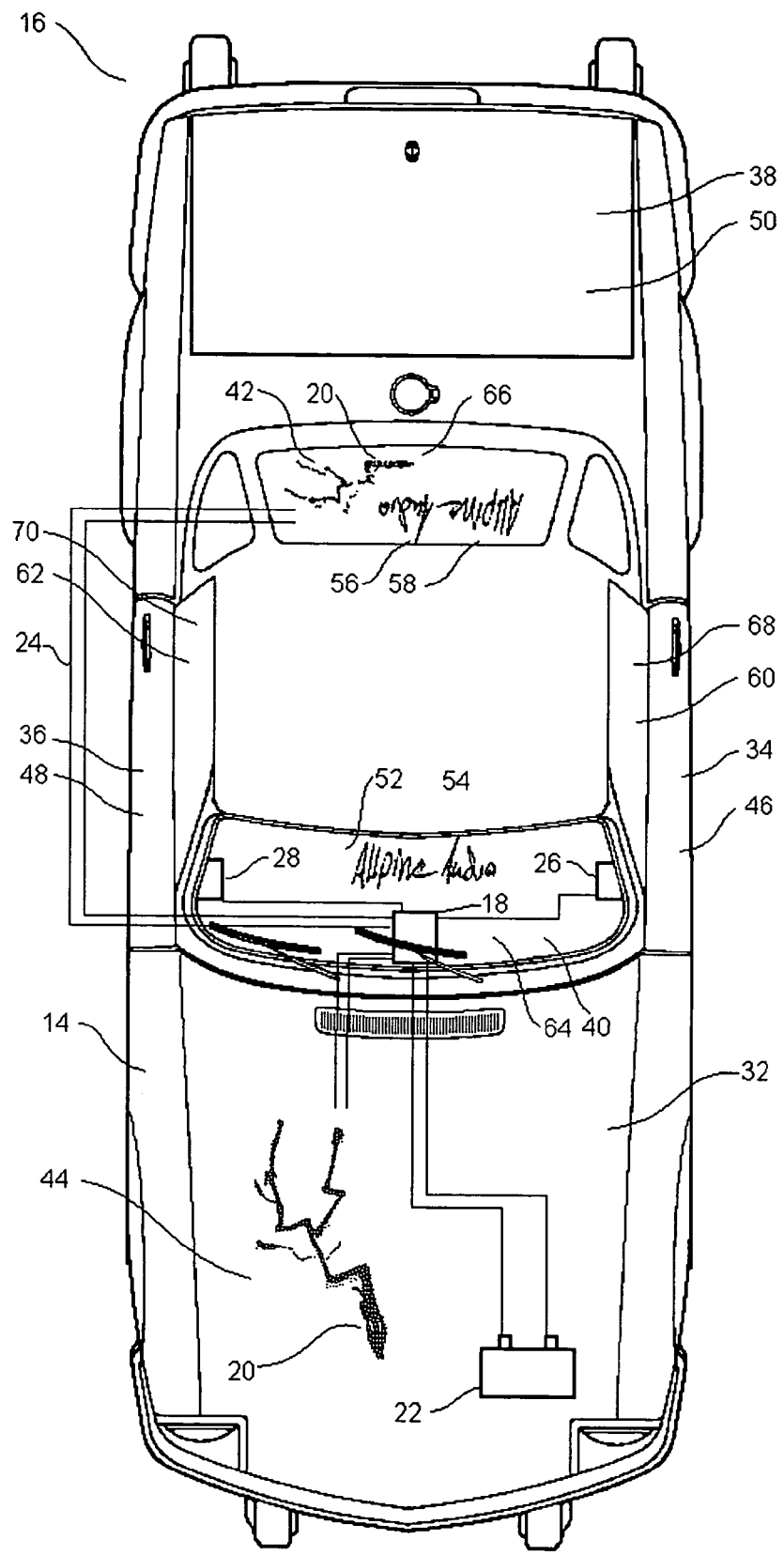
FIG. 2 is an exploded top plan view of the vehicle illustrated in FIG. 1.

Referring to FIG. 2, it is anticipated that vehicle owners will want to have more than one film 12 and more than one conductive circuit 24. They will want multiple display areas on their vehicle and then will not want the same image displayed in all locations. Each film and conductive circuit represents a discrete display zone. Most, if not all vehicles, will have more than one display zone. Referring to FIG. 2, vehicle 16 is illustrated as being an automobile having a front hood 32, a driver's side door panel 34, a passenger's side door panel 36, a trunk 38, a front windshield 40 and a rear windshield 42. The components will, of course, vary if vehicle were a bus or a boat. Each of these components has an area that serves as a potential display zone, assuming that a film 12 is attached to the component and connected to controller 18 and power source 22 by a conductive circuit 24. This potentially creates a front hood zone 44 on front hood 32, a driver's side zone 46 on driver's side door panel 34, a passenger's side zone 48 on passenger side door panel 36, a trunk zone 50 on trunk 38, a front windshield zone 52 along a top portion 54 of front windshield 40 and a rear windshield zone 56 along a bottom portion 58 of rear windshield 42. It is possible that the entire surface of the automobile could be divided into display zones or treated as a single display zone. If this were the case, the colour of the automobile could be selectively changed through the controller. This could be a conventional change, where the automobile is changed from blue to green. It also could be an unconventional change, where the vehicle was changed from polka dots to stripes. The stripes could would be placed in motion when the car was operation and then would remain fixed when the car was parked and turned off.

Where laws permit, it will also possible to create multiple window zones. Some jurisdictions do not allow decals on windows, except along top portion 54 of front windshield 40 and a top portion 58 (or bottom portion) of rear windshield 42. Referring to FIG. 1, in addition to front windshield 40 and rear windshield 42 there are driver side windows 60 and passenger side windows 62. This creates further zones including: an extended front windshield zone 64 covering the balance of front windshield 40, an extended rear windshield zone 66 covering the balance of rear windshield 42, a driver's side windows zone 68 covering driver's side windows 60, and a passenger's side windows zone 70 covering passenger's side windows 62.

Whenever, a graphic image is displayed it is possible to provide a colour background to the graphic image. When the graphic is on one of the above referenced windows, the colour background serves as a window tint. The window tint can be any colour that the vehicle owner may wish to select from a pallet of colours provide by controller 18. It is envisaged that the tint and graphic be translucent so as to provide viewing through the windows when the vehicle is in operation. When the vehicle is parked the tint and graphic will be darkened to conceal the contents of the vehicle. It is also feasible to provide a tint and graphic that is "mirrored", so that persons on the inside can look out—but persons from the outside can not look in.

Even those jurisdictions that do not allow window tint or window decals on some or all of the vehicle's windows, have no prohibitions when the vehicle is not in operation. It would, therefore, be feasible for the windows to be kept clear during operation and then darkened by tint and graphics to conceal the interior of the vehicle, when the vehicle was parked.

If desired, alpha-numeric characters may be displayed along with graphic images. When one examines popular decals, many include a graphic image in combination with alpha-numeric characters. It is also possible to have just alpha-numeric characters providing a message. Referring to FIGS. 1 and 2, the alpha-numeric characters selected are an advertisement for "Alpine Audio". Referring to FIG. 3, it is preferred that controller 18 be provided an interface 72 which enables alpha-numeric character input into memory. The interface 72 illustrated is a USB port. This enables personalized alpha-numeric messages to be displayed, which are input from a computer, such as a personal digital assistant.

Figure 3:
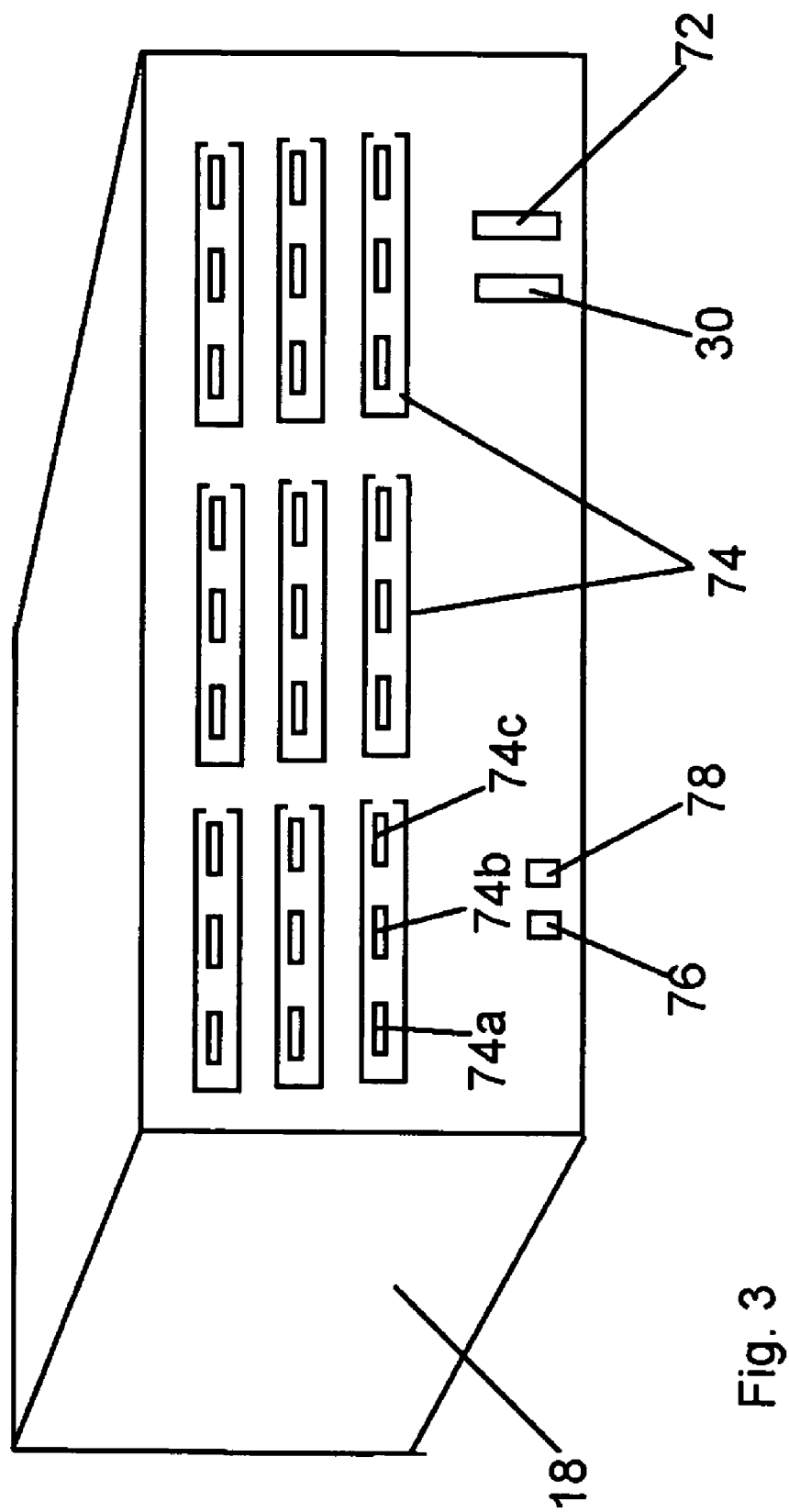
FIG. 3 is a detailed perspective view of the controller for the vehicle customized with decals illustrated in FIG. 1.

Referring to FIG. 3, in order to permit colour display, the connection of each zone to controller 18, which connection is generally indicated by reference numeral 74, includes a red connection 74*a*, a green connection 74*b* and a blue connection 74*c*. It will be appreciated that controller 18 will also have audio input connectors 76 and 78. Controller will also have power input (not shown). Controller 18 will also have control buttons (not shown) which are used to switch images, designate different images to different zones, changes background colouration for the images, and handle all of the other control functions which have been described.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property of privilege is claimed are defined as follows:

1. A method of customizing a vehicle with decals, comprising the steps of:

securing a film of light emitting materiel containing a matrix of pixels to a body of a vehicle;

providing a controller having a memory in which is stored more than one graphic image, the controller following a display sequence in which the graphic image displayed on the film is dynamically changing;

providing a power source;

connecting the film to the controller and power source via a conductive circuit; and displaying the at least one graphic image stored in the memory of the controller on the film by selectively illuminating pixels in the matrix.

2. The method as defined in claim 1, the controller being connected to an audio output device which plays music, the display sequence being coordinated with music from the audio output device, such that the dynamically chancing graphic images displayed on the film appear to be dancing to the music.

3. The method as defined in claim 1, the controller being connected to an audio output from a vehicle theft alarm system, the display sequence being coordinated with the audio output from the vehicle theft alarm system, such that the dynamically changing graphic images displayed on the film change frenetically when an alarm condition exists.

4. The method as defined in claim 1, the controller having an interface which enables new graphic images to be downloaded into the memory of the controller.

5. The method as defined in claim 1, there being more than one film and more than one conductive circuit, each film and conductive circuit representing a discrete display zone, there being more than one display zone.

6. The method as defined in claim 5, the more than one display zone including at least two of a front hood zone, a driver's side door zone, a passenger's side door zone, a trunk zone, a top portion of a front windshield zone or a bottom portion of a rear windshield zone.

7. The method as defined in claim 5, there being multiple window zones including at least two of a front windshield zone, a rear windshield zone, driver's side windows zone, or passenger's side windows zone.

8. The method as defined in claim 7, a background to the graphic image being displayed providing a window tint.

9. The method as defined in claim 1, alpha-numeric characters being displayed along with the at least one graphic image.

10. The method as defined in claim 9, the controller having an interface which enables alpha-numeric character input into the memory of the controller, such that personalized alpha-numeric messages can be displayed.

11. The method as defined in claim 1, the power source being a battery of the vehicle to which the film is secured.

12. A decal assembly, comprising in combination:

a body of a vehicle;

a film of light emitting material containing a matrix of pixels attached to the body;

a controller having a memory in which is stored at least one graphic image;

a conductive circuit connecting the film and the controller to a batter of the vehicle, whereby the at least one graphic image stored in the memory of the controller is displayed on the film by selectively illuminating pixels in the matrix;

the matrix being an active-matrix in which each pixel remains static in either an "on" or "off" condition until the graphic image is changed by the controller.

13. The decal assembly as defined in claim 12, wherein the film covers the entire body of the vehicle, thereby enabling the coloration of the vehicle to be changed.

14. The decal assembly as defined in claim 12, wherein more than one graphic image is stored in the memory of the controller, the controller following a display sequence in which the graphic image displayed on the film is dynamically changing.

15. The decal assembly as defined in claim 14, wherein the controller is connected to an audio output device which plays music, the display sequence being coordinated with music from the audio output device, such that the dynamically changing graphic images displayed on the film appear to be dancing to the music.

16. The decal assembly as defined in claim 12, wherein the controller has an interface which enables new graphic images to be downloaded into the memory of the controller.

17. A method of customizing a vehicle with decals, comprising the steps of:

securing a film of light emitting material containing a matrix of pixels to a body of a vehicle, the matrix being an active-matrix in which each pixel remains static in either an "on" or "off" condition until the graphic image is changed by the controller;

providing a controller having a memory in which is stored at least one graphic image;

providing a power source;

connecting the film to the controller and power source, via a conductive circuit; and displaying the at least one graphic image stored in the memory of the controller on the film by selectively illuminating pixels in the matrix.

18. The method as defined in claim 17, the film covering the entire body of the vehicle, thereby enabling the coloration of the vehicle to be changed.

19. The method as defined in claim 18, the film being one of a polymer light emitting diode, an organic light emitting diode, organic vapor phase deposition or flexible liquid crystal display.

* * * * *